Figure 1:
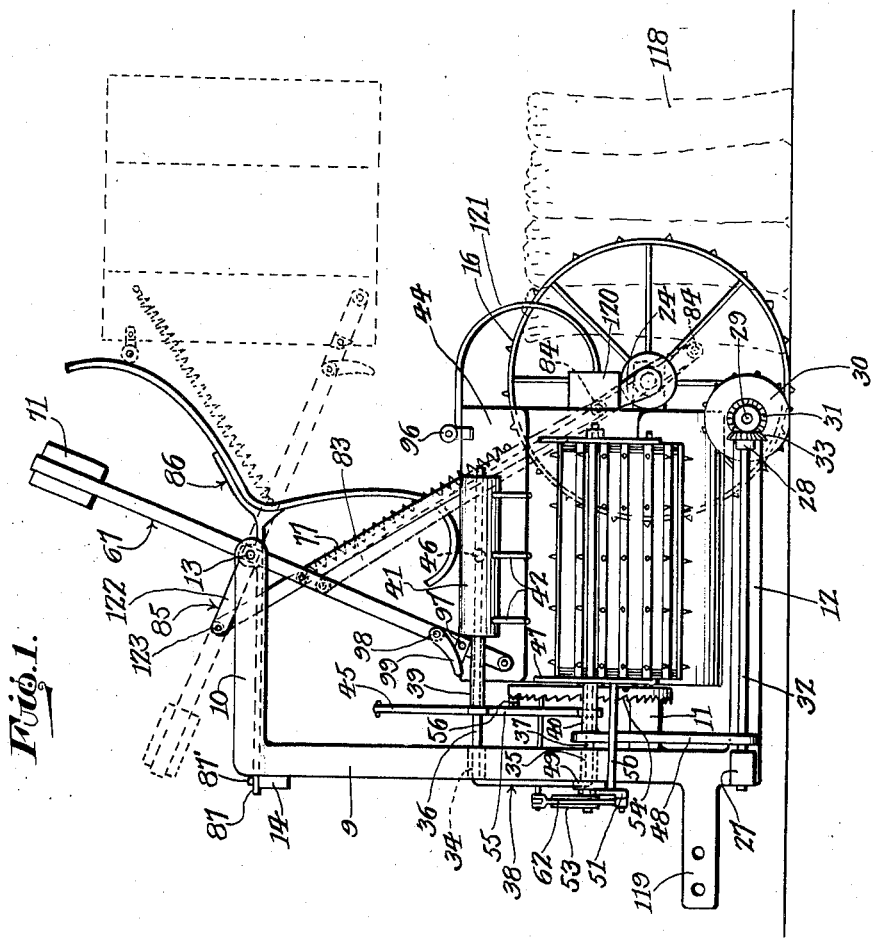

July 31, 1934.  A. P. LOFSTRAND  1,968,782
AUTOMATIC GRAIN SHOCKER
Filed Feb. 21, 1934   3 Sheets-Sheet 1

Inventor
*Albin P. Lofstrand*

By *Geo. F. Kimmel*
Attorney

July 31, 1934.  A. P. LOFSTRAND  1,968,782
AUTOMATIC GRAIN SHOCKER
Filed Feb. 21, 1934  3 Sheets-Sheet 2

Inventor
Albin P. Lofstrand

By Geo. P. Kimmel
Attorney

July 31, 1934.  A. P. LOFSTRAND  1,968,782
AUTOMATIC GRAIN SHOCKER
Filed Feb. 21, 1934    3 Sheets-Sheet 3
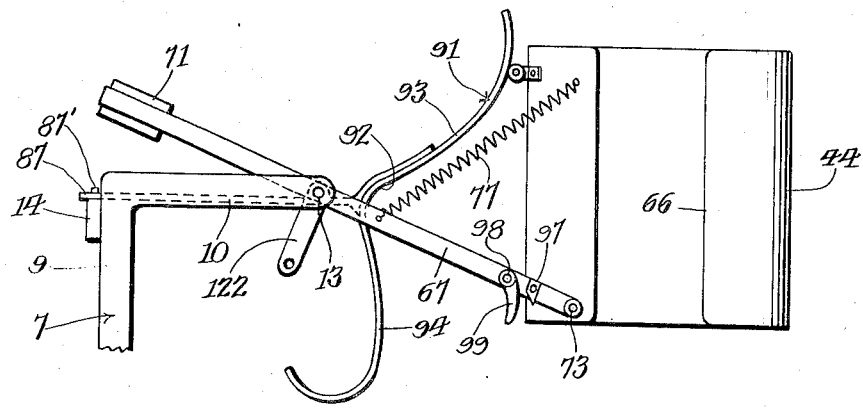
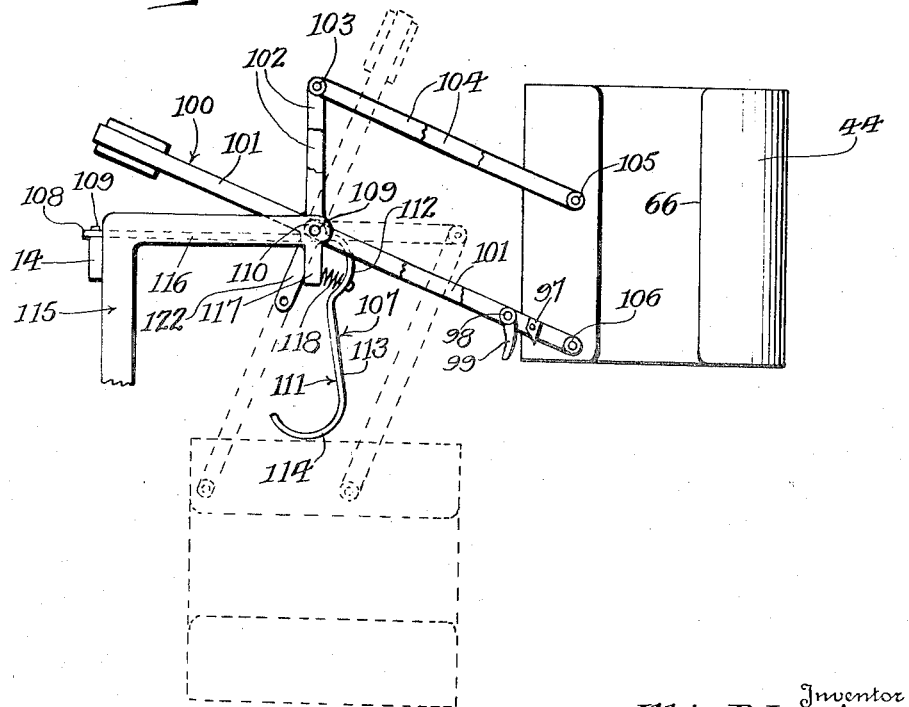
Inventor
Albin P. Lofstrand
By
Geo. T. Kimmel
Attorney Patented July 31, 1934

1,968,782

UNITED STATES PATENT OFFICE 1,968,782

AUTOMATIC GRAIN SHOCKER

Albin P. Lofstrand, Chicago, Ill.

Application February 21, 1934, Serial No. 712,397

10 Claims. (Cl. 56—424)

This invention relates to an automatic grain shocker, and has for its object to improve and simplify the construction, as well as to increase the efficiency and utility of the grain shocker disclosed by Letters Patent 1,340,781, 1,569,230 granted to me May 18, 1930, January 12, 1926 respectively, and my application Serial Number 689,468, filed September 14, 1933.

The invention has for its object to provide, in a manner as hereinafter set forth, an automatic grain shocker so constructed and arranged as to overcome the necessity of employing tracks for the bunch dumping receptacle when the latter is moved to and from dumping position.

A further object of the invention is to provide, in a manner as hereinafter set forth, an automatic grain shocker including a shiftable bunch receiving and dumping receptacle and new, simple, strong, improved, thoroughly efficient means for turning the receptacle from bunch receiving to bunch dumping positions and from bunch dumping to bunch receiving positions during the shifting of the receptacle to and from bunch dumping position.

Further objects of the invention are to provide, in a manner as hereinafter set forth, an automatic grain shocker which is comparatively simple in its construction, strong, durable, compact, readily assembled, thoroughly efficient in its use, conveniently repaired when occasion requires, and comparatively inexpensive to set up.

To the above ends essentially and to others which may hereinafter appear, the invention consists of such parts, and such combination of parts which fall within the scope of the invention as claimed.

Figure 2:
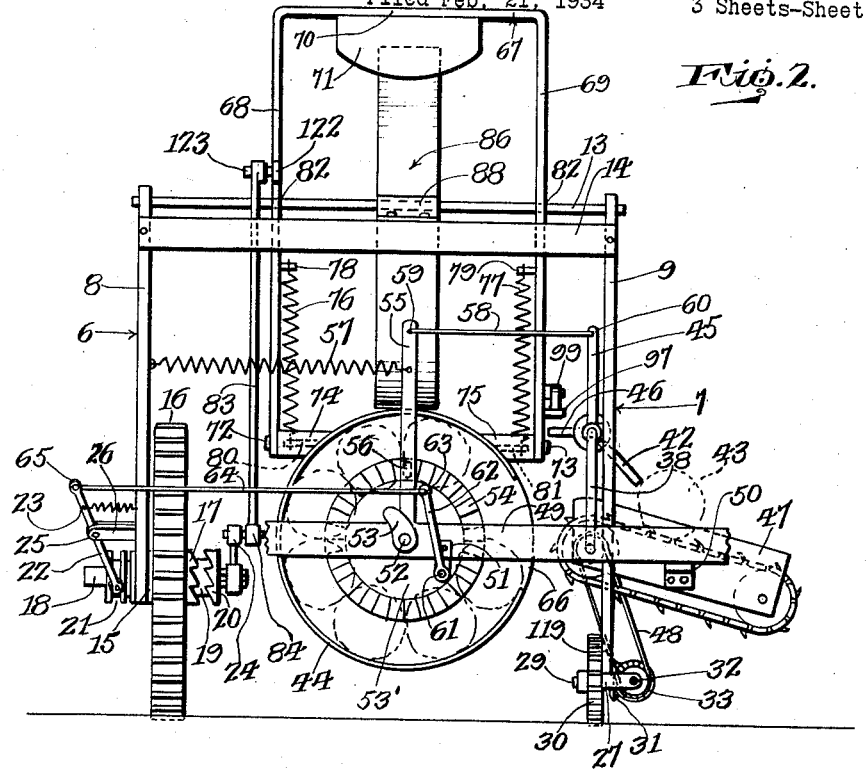
Figure 3:
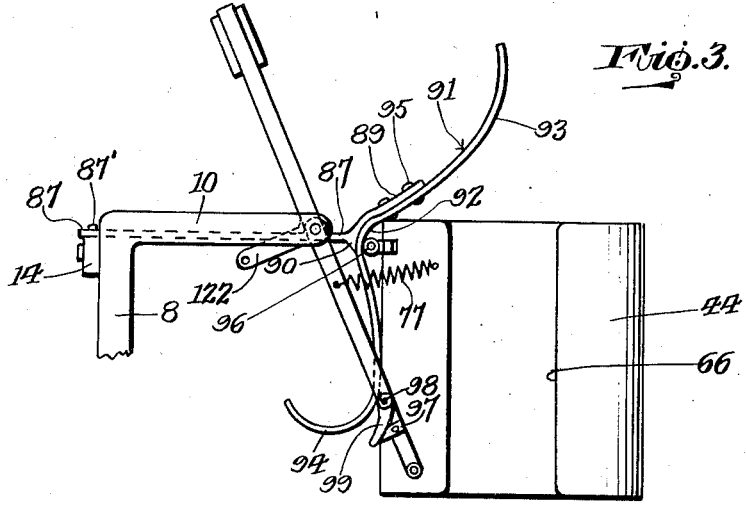

In the drawings:

Figure 1 is a side elevation of the shocker, illustrating in full lines the bunch dumping receptacle in bunch receiving position, in dotted lines in bunch dumping position and also in dotted lines the shock dumped from the receptacle, Figure 2 is a front elevation of the shocker with the dumping receptacle in bunch receiving position, Figure 3 is a fragmentary view illustrating the dumping receptacle turned from a horizontal to a vertical position and as it starts to move upwardly and rearwardly to the point for completely dumping the bunches therefrom and further showing the counterbalanced means for shifting the receptacle to and from dumping position, Figure 4 is a view similar to Figure 3 with the dumping receptacle moved to a point to completely dump the bunches therefrom, and Figure 5 is a view similar to Figure 4 illustrating a modified form of counterbalanced means for shifting the dumping receptacle, and showing in full lines the receptacle in dumping position and in dotted lines said receptacle in bunch receiving position.

The shocker includes a pair of upstanding spaced opposed side frames 6, 7. The frames 6, 7 include vertically disposed front uprights 8, 9 and rearwardly disposed arms 10 integral with and extended from the upper ends of uprights 8, 9. The arms 10, only one of which is shown, are of the same length, disposed in parallel spaced relation and of less length than the uprights. The upright 8 is of less length than the upright 9, has its upper end aligning with the upper end and its lower end positioned above the lower end of upright 9. Formed integral with the lower ends of uprights 8, 9 and extending rearwardly therefrom are bottom bars 11, 12 respectively. The bar 11 is arranged above and is of greater length than bar 12. The rear ends of the arms 10 are connected together by a cross bar 13 which constitutes a pivot for a purpose to be presently referred to. The uprights 8, 9 in proximity to their upper ends are connected together by a cross member 14.

Revolubly supported as at 15 from the rear end of bottom bar 11 is a traction wheel 16. The latter is positioned on the inner side of bar 11 and has its inner side formed with a clutching member 17. Slidably mounted on and keyed to a shaft 18 is a shiftable sleeve 19, provided at its inner end with a clutching member 20, which coacts with clutching member 17 for coupling shaft 18 with wheel 16 to provide for the operation of the former from the latter. The outer end of sleeve 19 carries a grooved collar 21 into which extends the yoke 22 of a shifting lever 23 acting to move the clutching member 20 to and from clutching position with respect to the clutching member 17. The shaft 18 extends outwardly and inwardly with respect to the inner and outer ends of sleeve 19 and carries on its inner end a crank arm 24. The lever 23 is pivotally mounted intermediate its ends, as at 25 to an arm 26 supported from frame 6. The lever 23 is inclined from front to rear.

The bottom bar 12 of frame 7 has extended from its outer face at the forward end thereof a bearing 27. The bar 12 at its rear end is formed with an outwardly directed bearing 28 aligning with bearing 27. Journaled in the rear end of bar 12 is a shaft 29 carrying a traction wheel 30 on its inner end and a beveled pinion 31 on its outer end. The wheel 30 is arranged opposite and is of a diameter materially less than that of wheel 16. Journaled in the bearings 27, 28 is a shaft 32 provided on its rear end with a beveled pinion 33 which meshes with and is driven from pinion 31.

The inner side face of upright 9 of frame 7 has connected therewith a pair of superposed spaced brackets 34, through which extend the upper and lower legs 36, 37 respectively of a horizontally disposed yoke-shaped support 38 having its vertical leg positioned slightly forward of the upright 9.

Revolubly mounted upon the legs 36, 37 are tubular shafts 39, 40 respectively. The shaft 39 has a portion of enlarged diameter 41 to form what may be termed a drum which has fingers 42 extended therefrom. The fingers are arranged in the path of travel of the bunches 43 as they are conveyed toward the dumping receptacle 44. Carried by the portion of reduced diameter of shaft 39 is a crank arm 45. Extending from the portion 41 of shaft 39 is a crank arm 46. The crank arm 45 is normally vertically disposed. The crank arm 46 extends inwardly from the portion 41 of shaft 39 and is normally disposed at right angles to arm 45. The crank arms 45, 46 are disposed at an angle with respect to the fingers 42.

Arranged below the fingers 42 and extended outwardly from frame 7 is a conveyor mechanism 47 which functions to transport the bunches 43 to the receptacle 44. The mechanism 47 is operated from a tubular shaft 40 driven by a belt transmission 48 operated from shaft 32.

Secured to the front edges of and connecting the uprights 8, 9 together is a supporting bar 49 extended outwardly from upright 9 and which is connected as at 50 with one side of the conveyor mechanism 47. The bar 49 carries a hanger 51.

Supported by bar 49 is the forward end of a shaft 52. Fixed to shaft 52 forwardly of bar 49 is a cam 53. The shaft 52 also has fixed thereto a circular plate 53' provided with an annular ratchet 54 positioned rearwardly of bar 49. Loosely mounted at its lower end upon shaft 52 is an upstanding intermittently operable lever 55 provided with a pivoted dog 56 of known form which coacts with the ratchet 54 for intermittently operating the shaft to provide for the cam 53 traveling in a circular path. The lever 55 is normally in a vertical position, and such position is had by a controlling spring 57 and a pull member 58. The spring 57 has one end anchored to lever 55 adjacent the top of the latter and its other end to upright 8. The member 58 has one end pivotally connected, as at 59 to the upper end of lever 55 and its other end pivotally connected, as at 60 to the upper end of crank arm 45. Pivotally connected at its lower end, as at 61 to the hanger 51 is an upstanding link 62. The upper end of the latter is pivotally connected as at 63 to one end of an operating bar 64 for the lever 23. The bar 64 has its other end pivotally connected as at 65 to the upper end of lever 23.

The receptacle 44 has one side thereof provided with an entrance opening 66 for the bunches 43, and its normal position is as shown in Figure 2, with one end opposing the circular plate 53'. That is to say, when the receptacle is receiving the bunches 43 it is disposed horizontally.

The receptacle 44 is shifted to and from bunch dumping position by a pivotally supported spring controlled counterbalanced inverted yoke 67 formed of a pair of side bars 68, 69, a head bar 70 and a counterweight 71 fixed to the bar 70 centrally of the latter. The lower ends of the side bars 68, 69 are pivotally connected as at 72, 73 respectively to oppositely extending lateral protuberances 74, 75 anchored to opposite sides of the top of receptacle 44. The controlling springs for yoke 67 are indicated at 76, 77 which are anchored at one end to pins 78, 79 respectively, carried by the side bars 68, 69 respectively. The other ends of springs 76, 77 are anchored to pins 80, 81 respectively secured to opposite sides of the top of receptacle 44. The side bars 68, 69 between their transverse medians and upper ends are pivotally mounted, as at 82 upon the cross bar 13.

An actuating means for shifting the yoke 67 in a direction to move the receptacle 44 from receiving to dumping position is operated from the crank arm 24 on shaft 18 when the latter is clutched to wheel 16. The manner in which wheel 16 and shaft 18 are clutched and unclutched will be hereinafter referred to. The said actuating means comprises an upstanding bodily shiftable pitman 83, which is pivotally connected at its lower end, as at 84 to the outer end of crank arm 24. The upper end of pitman 83 is pivotally connected with the side bar 68 of yoke 67 below the cross bar 13 as at 85.

There is provided for the receptacle 44 a combined guiding, turning and positioning element 86. The latter has an upstanding part which associates with receptacle 44 and is disposed to extend above, below and rearwardly of the cross bar 13. The element 86 includes a horizontally disposed hanger section 87 anchored at its forward end, as at 87' to bar 14. The section 87 is also anchored to bar 13, as at 88 and also extends rearwardly from bar 13. The rear end of section 87 is in the form of a pair of oppositely angled arms 89, 90, the latter being of less length than the former. The element 86 also includes a combined guiding, turning and positioning section 91 for the receptacle 44 which is arranged to extend above, below and rearwardly of bar 13. The section 91 is suspended from the rear end of section 87. The section 91 is formed of an intermediate curved stretch 92, an upper end stretch 93 of segmental curvature extending above section 87 for positioning receptacle 44 and a lower end stretch 94 of oval curvature depending from section 87 for turning receptacle 44. The stretch 92 and inner portion of stretch 93 abut the arms 89, 90. Holdfast means 95 anchor section 91 to section 87. The lower end of stretch 94 functions not only for turning receptacle 44 from and to horizontal position, but also holds the receptacle 44 in horizontal or receiving position. The stretch 93 is arranged rearwardly with respect to stretch 94.

The receptacle 44 is provided at its top and in proximity to one end thereof with a roller 96 which travels against the rear face of section 91 of element 86 during the movement of the receptacle to and from dumping position. The springs 76, 77 function to maintain the roller 96 against section 87.

The side bar 69 of yoke 67 has a cam stop 97 secured to its outer side face in proximity to its lower end. The stop 97 projects forwardly from bar 69. Arranged above the stop 97 and pivotally connected as at 98 to bar 69 is a forwardly extending cam 99 which functions, when element 67 is moving to its normal position, to engage under crank arm 46 to move the latter and provide for an impulse to shaft 39 in a direction to move crank arm 45 outwardly to provide for shifting lever 55 to move shaft 52 against the action of spring 57 for a purpose to be referred to. The cam 99 moves off of crank arm 46 as element 67 assumes its normal position.

The fingers 42 are disposed in the path of travel of the bunches 43 as the mechanisms 47 convey the bunches toward receptacle 44, whereby each bunch abuts the fingers and moves them inwardly until they are cleared by the bunch. As the fingers are moved inwardly, the shaft 39 is moved in a direction from receptacle 44 carrying crank arm 45 in a like direction whereby member 58 is pulled outwardly against the action of spring 57. On the pulling outwardly of member 58 the lever 55 is carried therewith whereby dog 56 coacting with ratchet 54 will impart an impulse to disc 53', which in turn will carry shaft 52 in a like direction. As shaft 52 moves cam 53 moves therewith. On a complete revolution of shaft 52, cam 53 will be brought against link 62 whereby the latter is moved on its lower pivot in a direction toward upright 9. The direction of shift of link 62 will provide for the operating bar 64 to move in a like direction and operate lever 23 in a manner to provide for the coupling of shaft 18 to wheel 16 whereby on the travel of the latter, shaft 18 will be operated to provide for the operation of the pitman 83 from crank 24. On the operation of pitman 83 the yoke element 67 will be shifted from its full line position to its dotted line position as shown in Figure 1. When element 67 is moved from its full line position, by pitman 83, the receptacle 44 will be carried therewith. The roller 96 traveling against stretches 92 and 94 will cause the receptacle 44 to assume the full line position shown in Figure 3. As the element 67 continues to move to reach the dotted line showing thereof, Figure 1, the roller 96 traveling against stretches 92, 93 will cause the receptacle 44 to assume its dotted line position, Figure 1. The stretch 93 provides for the disposing of receptacle 44, when the latter has been moved to complete dumping position rearwardly of the axis of wheel 16. As the yoke element 67 moves from dotted line to full line positions, Figure 1, the cam 99 will ride under, engage, shift and clear crank arm 46. When the latter is shifted from cam 99, the shaft 39 is operated in the same direction as operated from the fingers 42. When shaft 39 is operated from the cam 99, lever 55 is shifted in a direction against the pull of its spring 57, whereby dog 56 coacting with ratchet 54 will rotate shaft 52 to move cam 53 clear of link 62 and provide for the unlatching of shaft 18 from wheel 16 discontinuing the operation of pitman 83. As the yoke element 67 moves from dotted to full line position, Figure 1, the springs 76, 77 will maintain roller 96 against element 86, and when receptacle 44 reaches the lower part of stretch 94 the latter will act to turn receptacle 44 from upstanding to horizontal position.

With reference to Figure 5, a modified form of turning and shifting structure for the receptacle 44 is illustrated. The said structure includes an inverted counterbalanced yoke 100 operated in the same manner as element 67. Each side bar 101 of yoke 100 has extended therefrom an arm 102 having its outer end pivotally connected as at 103 to the outer end of a link 104. The inner end of the latter is pivotally connected as at 105 to one side of the top of receptacle 44. The inner end of each side bar 101 of yoke 100 is pivotally attached as at 106 to one side of the top of receptacle 44. The pivotal connections 105, 106 on each side of the top of receptacle 44 are spaced from each other, but arranged in parallel relation. Secured to and depending from the cross bar 13 is a spring controlled turning element 107 for receptacle 44. The element 107 includes a stretch 108 which is anchored as at 109 to cross bar 14 and also to the cross bar 13, as at 110. The element 107 also includes a stretch 111 which depends from the rear end of stretch 108. The stretch 111 consists of a rearwardly curved upper end part 112, a rearwardly inclined intermediate part 113 and an upwardly curved lower end part 114 of the same curvature as part 112 but disposed at right angles to and extending forwardly with respect to part 112. In the form shown in Figure 5, the side frame 115 is substantially the same as side frame 7, with this exception that the rearwardly extending arm 116 thereof is formed at its rear end with a depending lug 117 between which and the part 112 of stretch 111 is interposed a controlling spring 118. The stretch 111 provides a turning means for receptacle 44 and also acts as a resilient abutment for the receptacle when the latter is being moved from dumping to receiving position. The side bars 101 of yoke 100 are pivotally mounted upon cross bar 13 in the same manner as element 67. In Figure 5 the dumping and receiving positions of receptacle 44 are shown in full lines and dotted lines respectively.

A shock of bunches is indicated at 118, Figure 1. The upright 9 has extended forwardly therefrom a hitching or coupling arm 119 for connection to a traction means, not shown. The receptacle 44 is provided with a shock former 120 carried by a bracket 121. The connection 85 between pitman 83 consists of a crank arm 122 on yoke 67 and a pivot 123 extended through the upper end of pitman 83 and outer end of arm 122.

What I claim is:—

1. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, and means depending from said bar for turning the receptacle from receiving to dumping position and from dumping to receiving position during the moving of the receptacle to and from dumping position by said element.

2. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, means depending from said bar for turning the receptacle from receiving to dumping position and from dumping to receiving position during the moving of the receptacle to and from dumping position by said element, a normally inactive and unclutched actuating means for shifting said element, a clutching structure operated from the bunches transported to said receptacle for clutching said actuating means to a driving means therefor, and means carried by said element and active when said element moves in a direction toward its normally inactive position for releasing said clutching structure to disconnect said actuating means from its driving means.

3. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, and a combined guiding, turning and positioning means for said receptacle suspended from said cross bar.

4. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, a combined guiding, turning and positioning means for said receptacle suspended from said cross bar, controlling springs between said element and receptacle, and a roller on said receptacle for traveling against said means during the moving of the receptacle to and from dumping position.

5. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, and means depending from said cross bar and formed with a curved lower portion for turning the receptacle from receiving to dumping position and from dumping to receiving position during the moving of the receptacle to and from dumping position by said element.

6. A grain shocker comprising a shiftable bunch receiving and dumping receptacle, a pivotally mounted, normally inactive shiftable counterbalanced element pivotally connected at one end to said receptacle for moving the latter to and from dumping position, a bar constituting a combined support and pivot for said element, means depending from said cross bar and formed with a curved lower portion for turning the receptacle from receiving to dumping position and from dumping to receiving position during the moving of the receptacle to and from dumping position by said element, a normally inactive and unclutched actuating means for shifting said element, a clutching structure operated from the bunches transported to said receptacle for clutching said actuating means to a driving means therefor, and means carried by said element and active when said element moves in a direction toward its normally inactive position for releasing said clutching structure to disconnect said actuating means from its driving means.

7. A grain shocker comprising a shiftable bunch receiving and dumping receptacle, a pivotally mounted, normally inactive, shiftable, counterbalanced element pivotally connected to said receptacle for moving the latter to and from dumping position, a combined supporting and pivot means for and extending through said element, and means depending from said combined supporting and pivot means for turning the receptacle from receiving to dumping position and from dumping to receiving position during the moving of the receptacle to and from dumping position by said element.

8. A grain shocker comprising a shiftable bunch receiving and dumping receptacle, a pivotally mounted, normally inactive, shiftable, counterbalanced element pivotally connected to said receptacle for moving the latter to and from dumping position, a combined supporting and pivot means for and extending through said element, means depending from said combined supporting and pivot means for turning the receptacle from receiving to dumping position and from dumping to receiving position during the moving of the receptacle to and from dumping position by said element, a normally inactive and unclutched actuating means for shifting said element, a clutching structure operated from the bunches transported to said receptacle for clutching said actuating means to a driving means therefor, and means carried by said element and active when said element moves in a direction toward its normally inactive position for releasing said clutching structure to disconnect said actuating means from its driving means.

9. A grain shocker comprising a shiftable bunch receiving and dumping receptacle, a pivotally mounted, normally inactive, shiftable, counterbalanced element pivotally connected to said receptacle for moving the latter to and from dumping position, a combined supporting and pivot means for and extending through said element, and a combined guiding, turning and positioning means for said receptacle suspended from and extended above and depending below said combined supporting and pivot means.

10. A grain shocker comprising a shiftable bunch receiving and dumping receptacle, a pivotally mounted, normally inactive, shiftable, counterbalanced element pivotally connected to said receptacle for moving the latter to and from dumping position, a combined supporting and pivot means for and extending through said element, a combined guiding, turning and positioning means for said receptacle suspended from and extended above and depending below said combined supporting and pivot means, controlling springs between said element and receptacle, and a roller on said receptacle for traveling against said means during the moving of the receptacle to and from dumping position.

ALBIN P. LOFSTRAND.